United States Patent [19]

Taguchi et al.

[11] Patent Number: 4,890,096
[45] Date of Patent: Dec. 26, 1989

[54] COORDINATE INPUT DEVICE WITH DISPLAY

[75] Inventors: Yoshinori Taguchi; Tsuguya Yamanami, both of Ageo, Japan

[73] Assignee: Wacom Co., Inc., Saitama, Japan

[21] Appl. No.: 792,995

[22] Filed: Oct. 30, 1985

[30] Foreign Application Priority Data

Oct. 30, 1984 [JP] Japan .................. 59-228440

[51] Int. Cl.$^4$ .................................................. G08C 21/00
[52] U.S. Cl. .................................... 340/712; 340/706; 178/19
[58] Field of Search ........... 340/712, 706, 709, 365 C, 340/710; 178/18, 19, 20; 379/100

[56] References Cited

U.S. PATENT DOCUMENTS

| | | | |
|---|---|---|---|
| 3,801,733 | 4/1974 | Bailey | 178/19 |
| 3,851,097 | 11/1974 | Rodgers | 379/100 |
| 4,054,746 | 11/1977 | Kamm | 178/19 |
| 4,205,199 | 5/1980 | Mochizuki | 178/19 |
| 4,273,954 | 6/1981 | Takeuchi et al. | 178/19 |
| 4,520,357 | 5/1985 | Castleberry et al. | 340/712 |
| 4,561,002 | 12/1985 | Chiu | 340/365 C |
| 4,631,356 | 12/1986 | Taguchi | 340/784 |
| 4,639,720 | 1/1987 | Rympalski et al. | 340/712 |

*Primary Examiner*—Alvin Oberley
*Attorney, Agent, or Firm*—Pollock, VandeSande & Priddy

[57] ABSTRACT

A coordinate input device with a display includes a tablet composed of two position detecting units each formed by alternately arranged exciting and detecting lines parallel to each other on a magnetic member in the form of a sheet. These units are overlaid one upon the other so that exciting and detecting lines of one unit extend orthogonally with respect to those of the other. A planar display is overlaid on the tablet. The device further includes a position designating magnetic generator which locally applies a magnetic bias to the magnetic members of the tablet. The exciting lines of the tablet are supplied with an alternating current of a predetermined cycle by a driving current source. A position detecting circuit detects the coordinate values of a position designated by the position designating magnetic generator from the induced voltages respectively generated from the detecting lines of the tablet. The display is driven by a display control circuit. A modulating and demodulating circuit converts data represented by the coordinate values into a signal suitable for a transmission line and vice versa. The device further includes a processor which controls the above-described members and circuits. Position designation with respect to the tablet is effected by the position designating magnetic generator from the upper side of the display, whereby it is possible to input a position signal to the tablet under the display with high accuracy.

4 Claims, 6 Drawing Sheets

COORDINATE INPUT DEVICE WITH DISPLAY

BACKGROUND OF THE INVENTION

1. Field of the Invention:

The present invention relates to a coordinate input device with a display which is capable of transmitting information about handwritten characters and figures through a telephone circuit or the like and of immediately displaying transmitted information in the form of original handwritten characters or figures.

2. Description of the Related Art:

Examples of conventional systems for transmitting figure data using a telephone circuit or the like include facsimile systems. Conventional facsimile systems, however, suffer from the following disadvantages. Namely, it is only possible for them to send information about characters or figures already written or printed on paper, and it is not possible to directly transmit information about handwritten characters or figures and to effect deletion or correction of character or figure data after it has been input. In addition, the conventional facsimile systems require a disadvantageously long time to transmit character or figure data, which involves unsatisfactory real-time operation performance.

SUMMARY OF THE INVENTION

It is a primary object of the present invention to provide a coordinate input device with a display which is capable of transmitting information (including character and figure information) to another device of the same type through a telephone circuit or the like and of immediately displaying information transmitted from another device of the same type on the display for visual checking of the same. The device comprises: a tablet composed of two position detecting units each formed by alternately arranging exciting lines and detecting lines parallel to each other on a magnetic member in the form of a sheet, these units being overlaid one upon the other so that the exciting and detecting lines of one unit extend orthogonally with respect to those of the other; a planar display overlaid on the tablet; a position designating magnetic generator which locally applies a magnetic bias to the magnetic members of the tablet; a driving current source which supplies the exciting lines of the tablet with an alternating current of a predetermined cycle; a position detecting circuit which detects the coordinate values of a position designated by the position designating magnetic generator from the induced voltages respectively generated from the detecting lines of the tablet; a display control circuit which drives the display; a modulating and demodulating circuit which converts data represented by the coordinate values into a signal suitable for a transmission line and vice versa; and a processor which controls the above-described members and circuits. By virtue of this arrangement, position designation with respect to the tablet is effected by the position designating magnetic generator from a position above the tablet, that is, from the upper side of the display, whereby a position signal can be input to the tablet under the display in a simple operation and with high accuracy, and the position information thus input can immediately and clearly be checked on the display. In addition, it is possible to transmit the position information (including character and figure information) to another device of the same type through a telephone circuit or the like and to enable the information transmitted from another device of the same type to be immediately checked on the display.

It is a second object of the present invention to provide a coordinate input device with a display in which the position designating magnetic generator is designed to be a cordless member which need not be connected to any portion of the device, whereby operability of the magnetic generator is improved, and it is possible to eliminate any possibility of obstructing the operator's view of the display.

It is a third object of the present invention to provide a coordinate input device with a display which enables any kind of display with any thickness to be used, provided that a small amount of magnetic field can be applied to a magnetostrictive transmission medium through the display employed from a position designating magnetic generator.

The above and other objects, features and advantages of the present invention will become clear from the following description of the preferred embodiment thereof, taken in conjunction with the accompanying drawings.

BRIEF DESCRIPTION OF THE DRAWINGS

The accompanying drawings show in combination one embodiment of the coordinate input device with a display according to the present invention, in which.

DESCRIPTION OF THE PREFERRED EMBODIMENT

Figure 1:
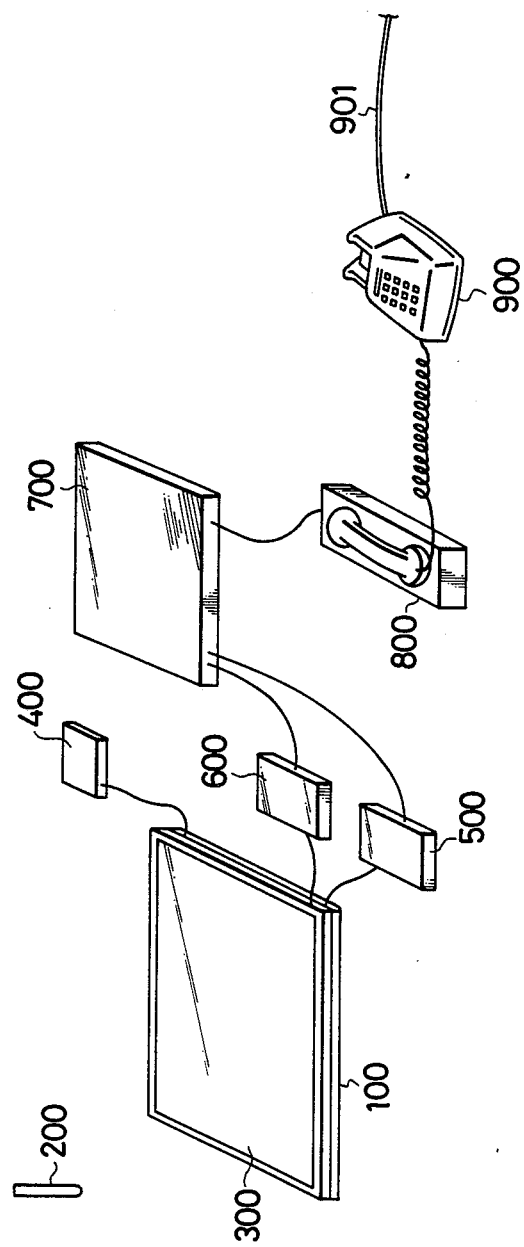
FIG. 1 is a schematic perspective view of the whole arrangement of the device according to the present invention.

Referring first to FIG. 1 which is a schematic perspective view of one embodiment of the coordinate input device with a display according to the present invention, the reference numeral 100 denotes a tablet for inputting coordinates, and the numeral 200 represents a position designating magnetic generator (referred to simply as a "magnetic pen", hereinafter) for designating coordinates. A planar display 300 is laid on the tablet 100. A driving current source 400 constantly generates an alternating current of a predetermined cycle, e.g., a sine-wave alternating current. A position detecting circuit 500 detects coordinate values on the tablet 100 designated by the magnetic pen 200. A display control circuit 600 drives the display 300. The reference numeral 700 denotes a processor, while the numeral 800 represents a modulating and demodulating circuit, e.g., an acoustic coupler, which converts a data signal into a signal for transmission and also converts a transmitted signal into a data signal. In addition, the numeral 900 denotes a telephone set, and 910 a telephone line.

Figure 2:
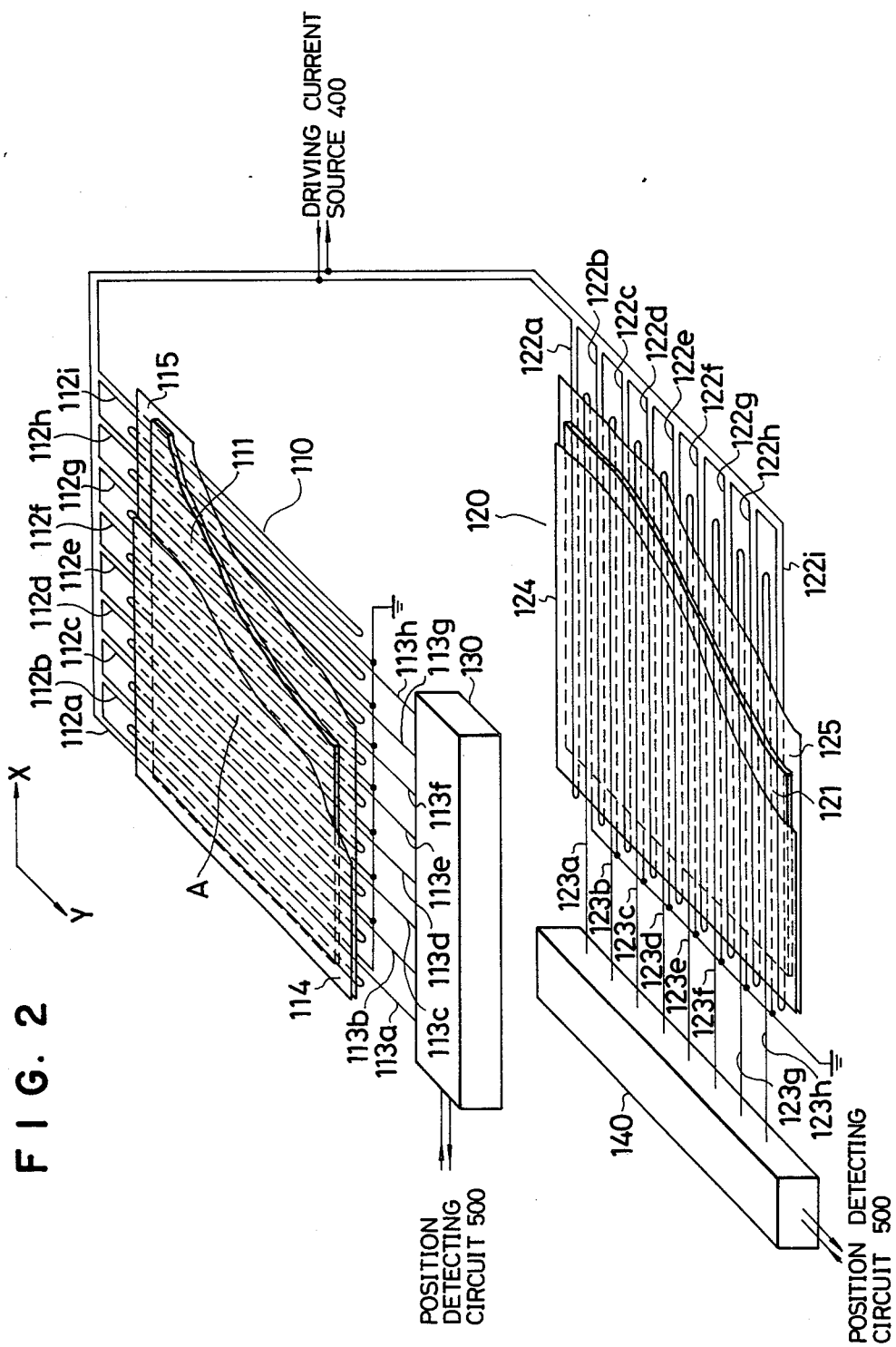
FIG. 2 is a partly cutaway exploded perspective view of the tablet of the device, which shows a principal arrangement thereof.
Figure 3:
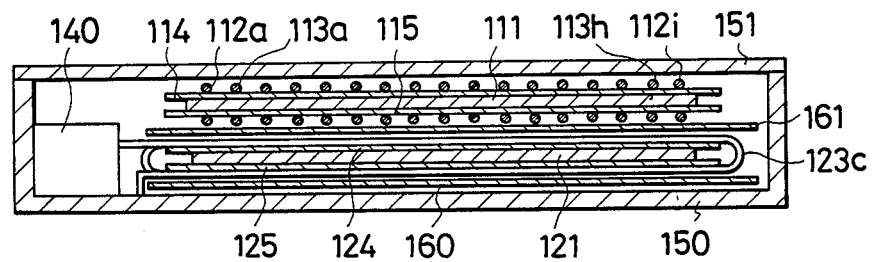
FIG. 3 is a sectional view of an essential portion of the tablet.

FIG. 2 is a partly cutaway exploded perspective view of the tablet 100, which shows a principal arrangement thereof, while FIG. 3 is a sectional view of an essential portion of the tablet 100.

In FIG. 2, an X-direction position detecting unit 110 is composed of a magnetic member 111 in the form of a sheet, exciting lines 112a to 112i, detecting lines 113a to 113h, and insulating sheets 114 and 115. The magnetic member 111 is sandwiched between the insulating sheets 114 and 115. The magnetic member 111 is preferably made of a material which is only magnetized very slightly by any magnet brought close to it, that is, a material which has small retentiveness and high magnetic permeability ($\mu$), e.g., an amorphous alloy or a permalloy. As an amorphous alloy, it is possible to employ, for example, $Fe_{79}B_{16}Si_5$ (atomic %) (a retentiveness of 0.2 Oe; a magnetic permeability ($\mu$) of 14,000). Since an amorphous alloy can be formed into a thin sheet with a thickness of 20 to 50 $\mu$m, such an amorphous alloy sheet may be employed as the magnetic member 111 in that form. The magnetic member 111 may also be constituted by a multiplicity of relatively long and thin magnetic member elements, e.g., amorphous alloy thin strips with a rectangular cross-section or amorphous alloy in the form of thin wires with a circular cross-section, which are arranged parallel to and in close contact with each other such so as to have a sheet-like configuration overall. In this case, better results will be obtained if the magnetic member elements are so arranged that the longitudinal axis of each element and the position detecting direction (the X-direction, in this case) coincide with each other.

The portion of each of the exciting lines 112a to 112i which is disposed on the upper surface of the insulating sheet 114 (this portion will be referred to as the "upper-half portion", hereinafter) and the portion of each line which is disposed on the lower surface of the insulating sheet 115 (this portion will be referred to as the "lower-half portion", hereinafter) are continuous with each other at one end of the exciting line. The other ends of the lower-half portions of the exciting lines 112a, 112b, 112c, 112d, 112e, 112f, 112g and 112h are respectively connected to the other ends of the upper-half portions of the exciting lines 112b, 112c, 112d, 112e, 112f, 112g, 112h and 112i. In other words, the exciting lines 112a to 112i are connected in series, and the other or second end of the upper-half portion of the exciting line 112a and the other or second end of the lower-half portion of the exciting line 112i are connected to the driving current source 400. The exciting lines 112a to 112i are disposed in parallel to each other at predetermined regular spacings in the direction orthogonal with respect to the X-direction, that is, the Y-direction.

The portion of each of the detecting lines 113a to 113h which is disposed on the upper surface of the insulating sheet 114 (this portion will be referred to as the "upper-half portion", hereinafter) and the portion of each detecting line which is disposed on the lower surface of the insulating sheet 115 (this portion will be referred to as the "lower-half portion", hereinafter) are continuous with each other at one end of the detecting line. The other ends of the respective upper-half portions of the detecting lines 113a to 113h are connected to a signal selecting means, e.g., a known multiplexer 130, while the other ends of the respective lower-half portions of the detecting lines 113a to 113h are grounded in common. In addition, each of the detecting lines 113a to 113h is disposed parallel to and between each pair of adjacent exciting lines 112a to 112i.

The Y-direction position detecting unit 120 is composed of a magnetic member 121 in the form of a sheet, exciting lines 122a to 122i, detecting lines 123a to 123h, and insulating sheets 124 and 125. The details of the structure of the Y-direction position detecting unit 120 are similar to those of the X-direction position detecting unit 110. The exciting lines 122a to 122i are connected to the driving current source 400, and one end of each of the detecting lines 123a to 123h is connected to a multiplexer 140, while the other end is grounded in common.

The Y-direction position detecting unit 120 is mounted on the bottom surface inside a non-magnetic metallic casing 150 through an insulating sheet 160. On the other hand, the X-direction position detecting unit 110 is overlaid on the Y-direction position detecting unit 120 so that they are as close to each other as possible, with an insulating sheet 161 interposed therebetween so that the respective exciting and detecting lines of these units 110 and 120 extend orthogonally with respect to each other, the units 110 and 120 being secured to each other by an adhesive or the like according to need. The multiplexers 130 and 140 are also mounted and secured inside the metallic casing 150. Further, a cover 151 made of a non-magnetic metal is placed on the upper side of the casing 150.

Figure 4:
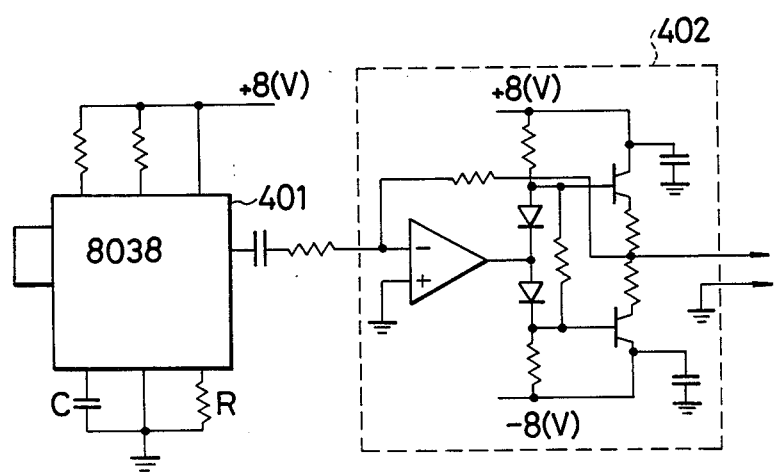
FIG. 4 is a circuit diagram of the driving current source of the device, which shows a practical arrangement thereof.

Referring next to FIG. 4 which is a circuit diagram showing a practical arrangement of the driving current source 400, the reference numeral 401 denotes a function generator, e.g., IC 8038 manufactured by Intersil, which outputs a sine-wave signal of a predetermined frequency determined by the value of a capacitor C and that of a resistor R. A power driver 402 is composed of an operational amplifier and a current amplifier and is arranged such as to current-amplify the sine-wave signal and deliver the thus amplified signal to the exciting lines 112a to 112i and 122a to 122i.

Figure 5:
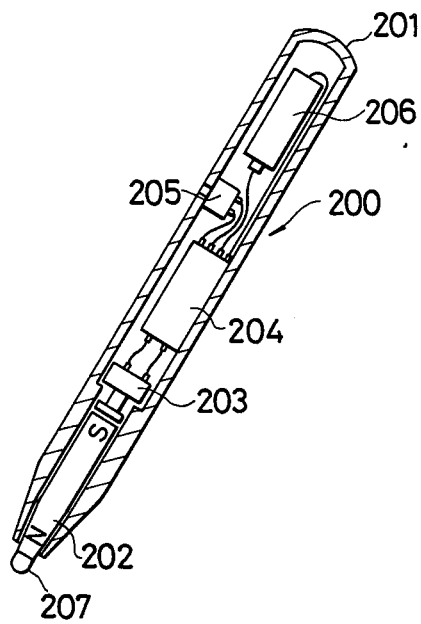
FIG. 5 is a sectional view of the magnetic pen of the device.
Figure 6:
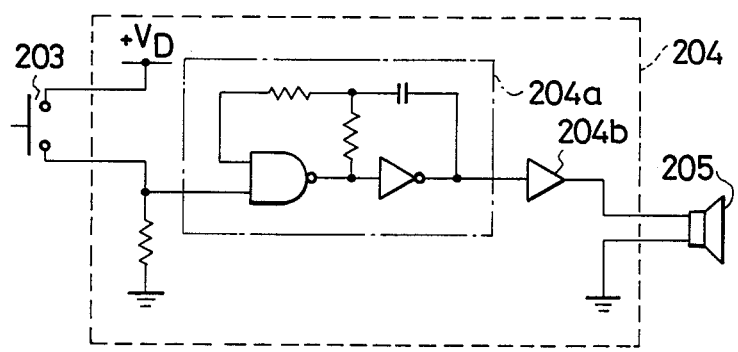
FIG. 6 is a diagram showing the electric circuit of the magnetic pen.

FIG. 5 is a sectional view of the magnetic pen 200, while FIG. 6 is a diagram showing the electric circuit of the magnetic pen 200. In FIG. 5, the reference numeral 201 denotes a pen-shaped container made of a synthetic resin or the like. A bar magnet 202 with a tapered tip is housed at one end of the container 201 so as to be slidable axially of the container 201. A control switch 203 is mounted inside the container 201 so as to face the inner end of the bar magnet 202. A transmitter 204 for transmitting an ultrasonic signal and an ultrasonic transmitter 205, together with a battery 206, are housed at appropriate positions inside the container 201. When an operator holds the container 201 and presses the tip of the bar magnet 202 covered with a rubber cover 207 against the input surface, the bar magnet 202 slides so as to turn ON the switch 203, thus activating an oscillation circuit 204a and an amplifier 204b in the transmitter 204 so that a signal which indicates the start of measurement, e.g., a continuous pulse signal of a predetermined frequency, is converted into an ultrasonic signal and transmitted from the ultrasonic transmitter 205.

For the display 300, a known matrix-type liquid crystal display panel may, for example, be employed in which a liquid crystal medium is interposed between a plurality of horizontal and vertical electrodes disposed orthogonally with respect to each other. The display area of the display 300 is set such as to be equal to, for example, the range within which information can be input to the tablet 100, and the display 300 is overlaid on the tablet 100 such that the display position of the display 300 coincides with the coordinate position of the tablet 100.

Figure 7:
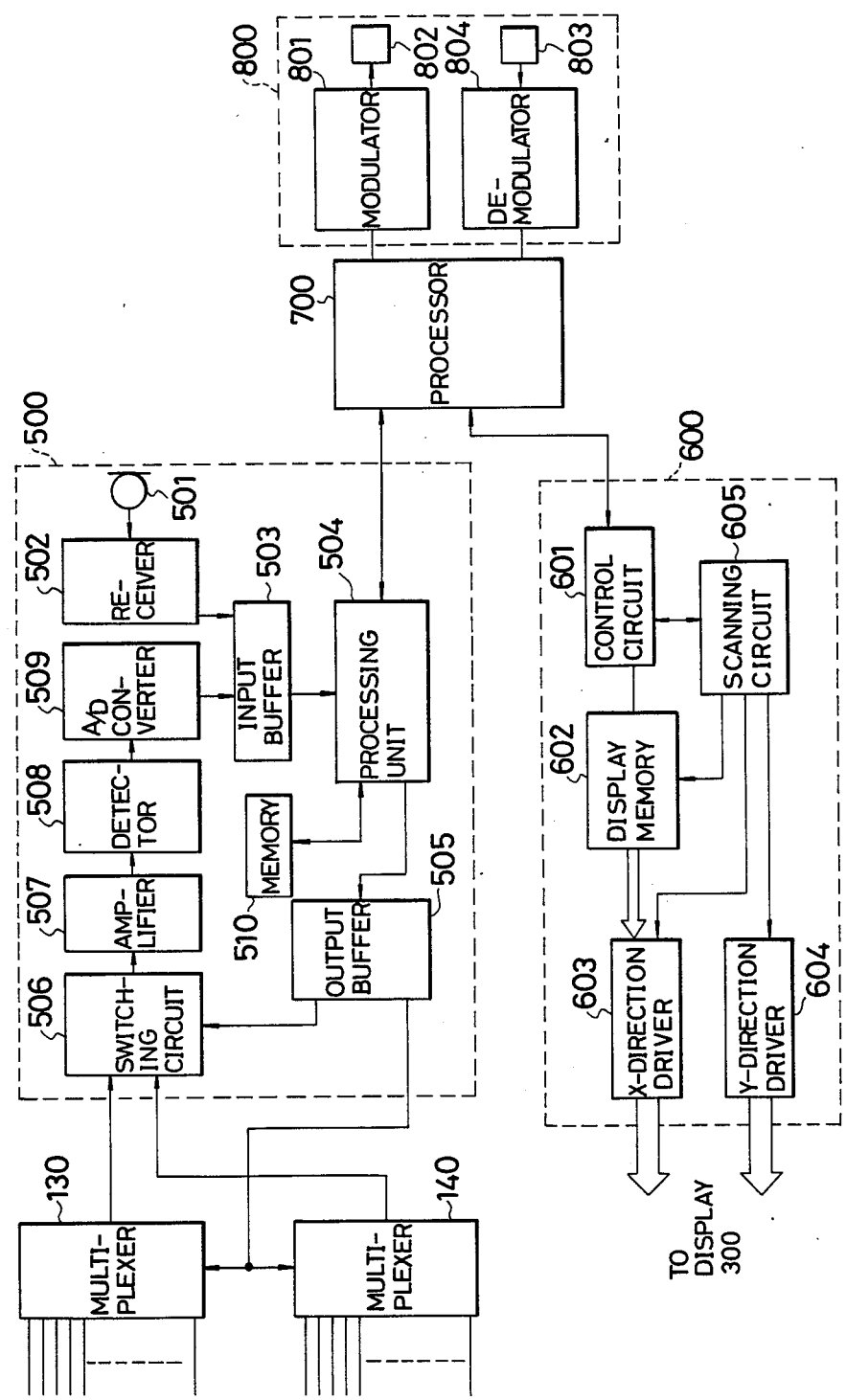
FIG. 7 is a circuit block diagram of an essential portion of the device.

FIG. 7 is a block diagram which shows an essential portion of the device according to the present invention. The operation of the device will be described below in detail by way of explanation of each circuit block.

Figure 8:
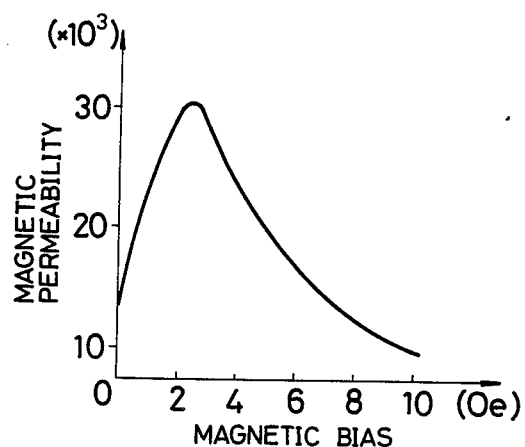
FIG. 8 is a characteristic chart showing the relationship between magnetic bias and magnetic permeability.

In the beginning, the detecting lines 113a to 113h and 123a to 123h of the tablet 100 have substantially equal induced voltages produced therein by electromagnetic induction caused by the alternating current flowing through the exciting lines 112a to 112i and 122a to 122i. Since this electromagnetic induction takes place through the magnetic members 111 and 121, the larger the magnetic permeability of the magnetic members 111 and 121, the larger the value of the induced voltage. The magnetic permeability of the magnetic members 111 and 121 greatly varies in accordance with the magnitude of the magnetic bias externally applied thereto. The degree by which the magnetic permeability changes differs, depending upon the composition of the magnetic material employed for the magnetic members 111 and 121, the frequency of the above-described alternating current, and whether or not a heat treatment is applied to the magnetic material. It is therefore possible to set the magnetic permeability so that it reaches its maximum when a certain magnetic bias is applied, as shown in FIG. 8. Accordingly, the application of a magnetic bias to the magnetic members 111 and 121 in this case increases the voltages induced in the detecting lines 113a to 113h and 123a to 123h by the alternating current flowing through the exciting lines 112a to 112i and 122a to 122i.

It is now assumed that, in FIG. 2, the tip of the bar magnet 202 of the magnetic pen 200 is pressed against the input surface (the upper surface of the display 300, in this case) at a position A which is a distance $X_S$ away from the detecting line 113a in the X-direction and which is a distance $Y_S$ away from the detecting line 123a in the Y-direction, and a magnetic bias for increasing the magnetic permeability which is thereby applied to the magnetic members 111 and 121.

Figure 9:
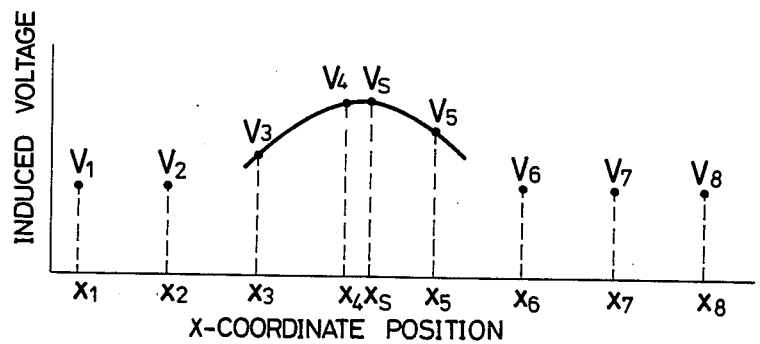
FIG. 9 is a graph showing one example of the induced voltage produced in each of the detecting lines in the X-direction.

At this time, induced voltages $V_1$ to $V_8$ shown in FIG. 9 are produced in the respective detecting lines 113a to 113h in the X-direction. In the graph shown in FIG. 9, the axis of abscissa represents coordinate positions $X_1$ to $X_8$ in the X-direction which correspond to the respective positions of the detecting lines 113a to 113h, while the axis of ordinates represents the value of induced voltages. The largest (maximum) value among the voltages $V_1$ to $V_8$ is obtained immediately below the position A.

On the other hand, since the tip of the bar magnet 202 of the magnetic pen 200 is pressed against the input surface, the switch 203 is turned ON, and an ultrasonic signal which indicates the start of measurement is transmitted from the ultrasonic transmitter 205. The ultrasonic signal is received by an ultrasonic receiver 501 and is then amplified and shaped by a receiver 502 before being delivered to an input buffer 503. When a processing unit 504 recognizes the start of measurement by reading out the measurement start signal from the input buffer 503, the unit 504 delivers a control signal to both a switching circuit 506 and the multiplexer 130 through an output buffer 505 so that the respective induced voltages in the detecting lines 113a to 113h in the X-direction are successively input to an amplifier 507. Each of the induced voltages is amplified by the amplifier 507 and rectified by a detector 508 so as to be converted into a DC voltage which is further converted into a digital value by an analog-to-digital (A/D) converter 509 and is then delivered to the processing unit 504 through the input buffer 503. In the processing unit 504, the induced voltages (digital values) are temporarily stored in a memory 510, and the coordinate value $X_S$ of the position A in the X-direction is obtained from these stored induced voltages.

There may be various methods of calculating the coordinate value $X_S$. One of them is a method wherein the waveform in the vicinity of the maximum value shown in FIG. 9 is approximated by an appropriate function, and the coordinate corresponding to the maximum value of the function is obtained. For example, when the induced voltages from the coordinate $X_3$ to the coordinate $X_5$ are approximated by a quadratic function (shown by the solid line in FIG. 9), the following formulae are formed from the induced voltages in the detecting lines and the coordinate values thereof, where the spacing between each pair of adjacent detecting lines 113a to 113h is assumed to be $\Delta X$.

$$V_3 = a(X_3 - X_S)^2 + b \qquad (1)$$

$$V_4 = a(X_4 - X_S)^2 + b \qquad (2)$$

$$V_5 = a(X_5 - X_S)^2 + b \qquad (3)$$

where a and b are constants ($a<0$). Further, the following formulae hold:

$$X_4 - X_3 = \Delta X \qquad (4)$$

$$X_5 - X_3 = 2\Delta X \qquad (5)$$

The formulae (4) and (5) are substituted into the formulae (2) and (3), respectively, and the formulae (2) and (3) are rearranged to obtain the following formula:

$$X_S = X_3 + (\Delta X/2)(3V_3 - 4V_4 + V_5)/(V_3 \Delta 2V_4 + V_3 \Delta 2 - V_4 + V_5) \qquad (6)$$

Accordingly, it is possible to obtain the coordinate value $X_S$ by substituting the voltages $V_3$, $V_4$ and $V_5$ and the coordinate value $X_3$ (known) of the detecting line 113c into the formula (6) and calculating the same.

The processing unit 504 first detects voltage values in the vicinity of the peak value among the induced voltages and takes them out. One example of the method of detecting such voltage value is to successively compare the induced voltages with each other as to the size. If a certain voltage $V_k$ is larger than the voltage $V_{k-1}$ which immediately precedes the voltage $V_k$ and is larger than the voltage $V_{k+1}$ which is immediately subsequent to the voltage $V_k$ (i.e., $V_{k-1} < V > V_{k+1}$), the voltage $V_k$ can be detected as a voltage which is the closest to the peak voltage. Thus, the above formula (6) is arithmetically processed by employing the voltages $V_{k-1}$, $V_k$ and $V_{k+1}$ and the coordinate values (known) of the detecting lines which respectively correspond to these voltages, thereby obtaining the coordinate value $X_S$. The thus obtained coordinate value $X_S$ in the X-direction is delivered to the processor 700 so as to be temporarily stored therein.

Next, the processing unit 504 delivers a control signal to both the switching circuit 506 and the multiplexer 140 through the output buffer 505 so that the respective induced voltages in the detecting lines 123a to 123h in the Y-direction are successively input to the processing unit 504. The processing unit 504 obtains the coordinate value $Y_S$ in the Y-direction by a processing operation similar to that described above and delivers the thus obtained coordinate value $Y_S$ to the processor 700. Thereafter, this operation is repeated, whereby position data successively designated can be obtained.

The position data composed of X-direction data and Y-direction data and stored in the processor 700 are successively delivered to a display memory 602 in the display control circuit 600 where the position data are arranged in accordance with a predetermined order and stored. The position data are successively read out in response to timing pulses delivered from a control circuit 601 and are output to an X-direction driver 603 and a Y-direction driver 604. The X- and Y-direction drivers 603 and 604 are further supplied with, as inputs, scanning pulses generated by a scanning circuit 605 in synchronism with the timing pulses generated by the control circuit 601 so that the drivers 603 and 604 drive the electrodes of the display 300 which correspond to the position data in the X- and Y-directions, whereby the position designated on the tablet 100 is displayed at the same position on the display 300. Accordingly, a character or figure handwritten with the magnetic pen 200 on the display 300 laid on the tablet 100 is displayed on the display 300 as it is by means of light.

On the other hand, the position data stored in the processor 700 is delivered to a modulator 801 in the acoustic coupler 800 where it is modulated into a signal within a voice frequency band, and this signal is further converted by a loudspeaker 802 into a voice signal which is transmitted through the telephone set 900 and the telephone line 901 to a device on the other end of the line 901. If the device on the other end of the line 901 is of the same type as the coordinate input device which has been described above, the same character or figure as the above can be displayed on the display of the device on the other end of the line 901. The position data transmitted from the device on the other end of the line 901 is passed through a microphone 803 and a demodulator 804 and is temporarily stored in the processor 700. The stored position data can be displayed on the display 300 through the display control circuit 600 in a manner similar to the above. If the processor 700 is additionally given character editing and figure processing functions, it is possible to effect correction, addition and deletion of a character or figure input to the tablet 100 and to display the thus processed character or figure on both the display 300 and the display on the other end of the line 901 at the same time.

Figure 10:
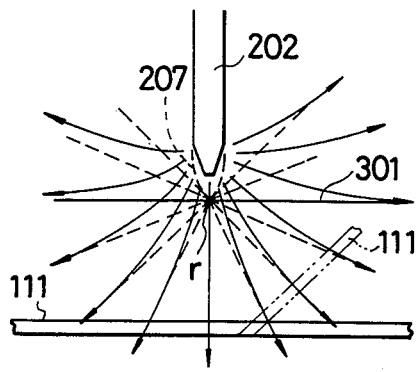
FIG. 10 shows the way in which position designation is effected by the magnetic pen.

FIG. 10 shows the way in which position designation is effected by the magnetic pen 200. The magnetic field produced from the tip of the bar magnet 202 is approximately regarded as produced from one point r on the prolongation of the center line of the bar magnet 202, as shown in FIG. 10. Accordingly, the input surface, that is, the upper surface 301 of the display 300, is formed at a position corresponding to the distance from the magnetic members 111 and 121 to the point r, and the magnetic pen 200 is so formed that the tip of the rubber cover 207 is positioned at the point r. By so doing, even if the bar magnet 202 is inclined with respect to the plane of the magnetic members 111 and 121 (in the illustrated example, the bar magnet 202 is inclined with respect to the plane of the magnetic member 111 shown by the two-dot chain line), there is no change in the direction of the magnetic field with respect to the same position on the magnetic members, and the detection position does not change either. Accordingly, it is possible to effect position designation independently of the inclination of the bar magnet 202. The experiments carried out on the device according to the present invention showed that errors were within ±0.5 mm when the inclination of the bar magnet 202 was within ±30° (the height of the input surface was 12 mm).

It is to be noted that the number of the exciting and detecting lines described in the embodiment is only an example and is, as a matter of course, not necessarily limitative thereto. It has experimentally been confirmed that position detection can be effected with relatively high accuracy when the spacing between each pair of adjacent detecting lines is about 2 to 6 mm. In addition, the position designating magnetic generator is not necessarily limited to a bar magnet and may be a magnet in the form of a plate, ring or rectangular parallelepiped, or an electromagnet.

Although in the above embodiment, the signal which indicates the start of measurement is transmitted from the magnetic pen 200 to the position detecting circuit 500 by employing an ultrasonic signal, a light signal such as an infrared signal may be employed in place of the ultrasonic signal. Since the signal indicating the start of measurement is merely employed to make the processing unit 504 recognize the coordinate detecting timing, it is not particularly necessary to deliver the signal from the magnetic pen 200, and the arrangement may be such that a signal for making the processing unit 504 recognize the detecting timing is delivered from a keyboard or a switching circuit provided on the position detecting circuit 500 itself.

Further, it is not particularly necessary for the display area of the display 300 to be set such as to be equal to the range within which information can be input to the tablet 100, and the display area may be smaller or larger than that range.

As has been described above, it is possible according to the present invention to input any character or figure with high accuracy simply by operating the position designating magnetic generator on the display and to permit the results of input to be immediately checked on the display. Since the display is laid on the tablet, the device according to the present invention is free from the disadvantage that a displayed charater of figure may be seen double by parallax. Unlike the conventional position designating magnetic generator which utilizes electromagnetic induction, it is not necessary for the magnetic generator according to the present invention to apply a magnetic field change or detect a magnetic field change. The present invention generator therefore, can be made cordless, which makes it possible to greatly improve the operability in inputting coordinates. Further, an input handwritten character or figure can be immediately transmittted to another device through a telephone circuit or the like, and the handwritten character or figure transmittted from another device can be immediately displayed on the display. Unlike the conventional facsimile systems, the device according to the present invention requires no paper, and it is therefore possible to effect a speedy position data processing. Furthermore, the position designating magnetic generator is required to apply only a small bias magnetic field to the tablet, and it is not necessary to bring the magnetic generator in close proximity to the tablet. For this reason, the limitation on the thickness of the display is reduced, and it is therefore possible to place on the display a member made of a material exclusive of the metal constituting the magnetic members, and to input coordinates from the upper side of this member.

What is claimed is:

1. A coordinate input device with a display comprising:
    a tablet having two position detecting units each formed by alternately arranged exciting and detecting lines positioned in parallel to each other on a magnetic member in a sheet-like configuration, one of these units superimposed over the other so that the exciting and detecting lines of the one unit extend orthogonally with respect to those of the other;
    a planar display superposed over said tablet;
    a position designating magnetic generator for locally applying a magnetic bias to the magnetic members of said tablet;
    a driving current source for supplying the exciting lines of each of the position detecting units of said tablet with an alternating current of a predetermined cycle;
    a position detecting circuit connected to said tablet for detecting the coordinate values of a position designated by said position designating magnetic generator from induced voltages respectively generated from the detecting lines of each of the position detecting units of said tablet;
    a display control circuit electrically connected to said tablet for driving said display;
    a modulating and demodulating circuit for converting data represented by said coordinate values into a signal suitable for a transmission line, said modulating and demodulating circuit also capable of converting signals received from the transmission line into data representative of coordinate values; and
    a processor connected to said position detecting circuit, said display control circuit and said modulating and demodulating circuit for providing controls thereto.

2. A coordinate input device according to claim 1, wherein said magnetic members are made of an amorphous alloy.

3. A coordinate input device according to claims 1 or 2, wherein said position designating magnetic generator is a cordless member not connected to any portion of said device.

4. A coordinate input device according to claim 1, wherein said display comprises a matrix-type liquid crystal display panel having a liquid crystal medium interposed between a plurality of horizontal and vertical electrodes extending orthogonally with respect to each other.

* * * * *

UNITED STATES PATENT AND TRADEMARK OFFICE
CERTIFICATE OF CORRECTION

PATENT NO.   : 4,890,096
DATED        : December 26, 1989
INVENTOR(S)  : Taguchi et al It is certified that error appears in the above-identified patent and that said Letters Patent is hereby corrected as shown below:

On the title page:

Under [73] Assignee, please change "Wacom Co., Inc."

to --Wacom Co., Ltd.--.

Signed and Sealed this

Twenty-ninth Day of December, 1992

*Attest:*

DOUGLAS B. COMER

*Attesting Officer*       *Acting Commissioner of Patents and Trademarks*